Oct. 12, 1971  H. N. BROYLES  3,611,524
METHOD FOR COVERING MATTRESSES AND THE LIKE
Filed Sept. 8, 1969  6 Sheets-Sheet 1

INVENTOR
HORACE N. BROYLES
BY Ralph N Kalish
ATTORNEY

Oct. 12, 1971   H. N. BROYLES   3,611,524
METHOD FOR COVERING MATTRESSES AND THE LIKE
Filed Sept. 8, 1969   6 Sheets-Sheet 2

INVENTOR
HORACE N. BROYLES
BY Ralph W. Kalish
ATTORNEY

Oct. 12, 1971    H. N. BROYLES    3,611,524
METHOD FOR COVERING MATTRESSES AND THE LIKE
Filed Sept. 8, 1969    6 Sheets-Sheet 3

INVENTOR
HORACE N. BROYLES
BY Ralph W. Kalish
ATTORNEY

Oct. 12, 1971    H. N. BROYLES    3,611,524
METHOD FOR COVERING MATTRESSES AND THE LIKE
Filed Sept. 8, 1969    6 Sheets-Sheet 4

INVENTOR
HORACE N. BROYLES
BY Ralph W. Kolish
ATTORNEY

Oct. 12, 1971  H. N. BROYLES  3,611,524
METHOD FOR COVERING MATTRESSES AND THE LIKE
Filed Sept. 8, 1969  6 Sheets-Sheet 5

INVENTOR
HORACE N. BROYLES
BY Ralph W. Kalish
ATTORNEY

Oct. 12, 1971  H. N. BROYLES  3,611,524
METHOD FOR COVERING MATTRESSES AND THE LIKE
Filed Sept. 8, 1969  6 Sheets-Sheet 6

INVENTOR
HORACE N. BROYLES
BY Ralph W. Kalish
ATTORNEY

United States Patent Office 3,611,524
Patented Oct. 12, 1971

3,611,524
METHOD FOR COVERING MATTRESSES
AND THE LIKE
Horace N. Broyles, 309 Pineapple St.,
Sebastian, Fla. 32958
Filed Sept. 8, 1969, Ser. No. 870,303
Int. Cl. B68g 7/00
U.S. Cl. 29—91.1          10 Claims

ABSTRACT OF THE DISCLOSURE

A method for producing mattresses, box springs, and related body support members, such as cushions, pads, etc., which comprehends encasing a resilient unit, whether the same be a box spring or a mattress core comprising an inner spring or a unitary block of cellular material, within an impervious film, and then through vacuum means withdrawing the air from said core for reducing the same volumetrically to a minor percentage of its normal volume; then inserting the air evacuated, film-covered unit within a cover; closing the cover while simultaneously permitting air flow to said unit to allow the same to return to normal volume within the cover; the cover having been appropriately closed during such expansion. The present method contemplates a procedure whereby the film may be retained upon the unit when inserted within the cover as well as withdrawn prior to completing the article formation.

BACKGROUND AND SUMMARY OF THE INVENTION

This invention relates in general to bedding manufacture and, more particularly, to a method for covering mattresses, box springs, and pads of all types.

It is an object of the present invention to provide a method for producing mattresses, box springs, pads and the like which is useful for mattresses of all types, whether the same be inner spring or cellular block character, and wherein covers of conventional construction may be used.

It is a further object of the present invention to provide a method of the character stated which obviates the utilization of filling machines and tape edge machines to thereby permit of substantial reductions in costly equipment heretofore deemed requisite for mattress production.

It is another object of the present invention to provide a method of the type stated which may be practiced by relatively unskilled personnel to hereby cause marked economies in production.

It is a still further object of the present invention to provide a method of the character stated which is amenable to high speed production, wherein are eliminated various of the procedures and production steps heretofore performed.

It is another object of the present invention to provide a method of the type stated wherein box springs may be suitably covered without utilization of a press.

It is another object of the present invention to provide a mehod of the type described wherein additional filling steps may be added within minimum space so that the said method is conducive to ease of expansion of production.

It is a still further object of the present invention to provide a method which may be performed in a most reliable manner since the equipment used is of simple, sturdy construction, thereby obviating costly breakdown during the manufacturing process.

It is a still further object of the present invention to provide a method of the type described which facilitates tailoring of the mattress cover for presentation of a high quality mattress and which method does not necessitate sewing of the mattress cover after the same has been applied to a mattress.

It is an additional object of the present invention to provide a method of the character stated which is equally amendable to cushion and pad formation.

DESCRIPTION OF THE PRACTICAL EMBODIMENTS

In essence, the present method contemplates subjecting a mattress body, such as an inner spring unit or a resilient block, fabricated of foam rubber, polyurethane foam, etc., as well as a box spring, after the same has been encased within a flexible, air impervious plastic sheeting to a vacuum whereby the same is volumetrically reduced to substantially less than its normal volume. While in said reduced state and still subject to the vacuum, the mattress body, box spring, etc. is then inserted within a cover. Thereupon the cover may be partially closed before removal of the vacuum and with the closing step being completed after removal of such vacuum whereby the mattress body or the like is permitted to expand to its normal volume for appropriately filling the cover.

Although the description hereinbelow is directed to the use of the present method in the production of mattresses and box springs, it muse be at all times recognized that this method is equally useful in the manufacture of covered cushions, pads and the like.

Figure 1:
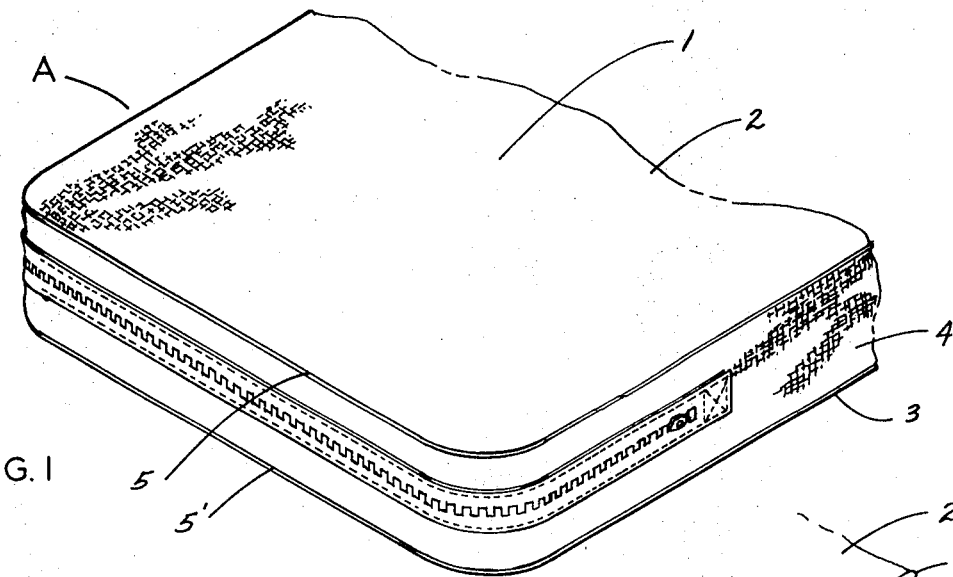
FIG. 1 is a fragmentary perspective view of an inner spring mattress covered in accordance with the present invention.
Figure 2:
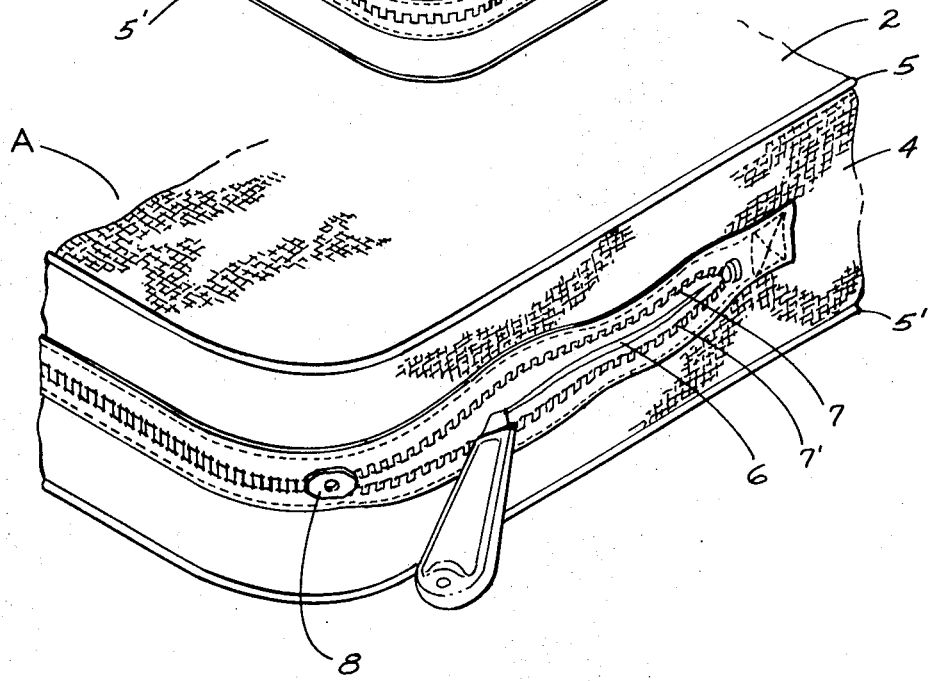
FIG. 2 is a fragmentary perspective view of the cover of the mattress shown in FIG. 1 but illustrating same during fabrication and prior to accepting the resilient member.

FIGS. 1–7, inclusive, illustrate the practice of the present method for mattresses incorporating inner springs and for covering box springs. Since the procedure for covering a box spring in accordance with this invention is identical with the method for disposing an inner spring unit within a mattress cover for completing an inner spring mattress, it is to be understood with respect to the disclosure herein below the coil spring assembly shown in the said figures is to be considered contemporaneously as an inner spring or box spring although the same may be referred to as an inner spring for facilitating description. A generally indicates a mattress of the inner spring type, having a cover or tick 1 comprised of top and bottom rectangular panels 2, 3, which latter are interconnected by a side panel or border 4 to the edges of which said top and bottom rectangular panels 2, 3 are secured as by lines of stitching (not shown) which are obscured by the customary finishing tape, as at 5. Provided along one end of said side panel 4 and continuing a relatively short distance along each adjacent lateral portion thereof is a line of opening 6 adapted for closure by a conventional slide fastener, as carried upon a tape, and comprising the usual double row of interlocking teeth 7, 7′ and a slide member 8. With reference to FIG. 2 it will be seen that during the fabrication of cover 1 the said slide fastener may be secured upon panel 4 and then slide member 8 is moved to open condition so as to expose the underlying portion of side panel 4 which is then suitably severed to provide said line of opening 6. It will be observed that cover 1, by means of its said line of opening 6, is intended for end feeding, that is, the mattress body will be insertable thereinto through such end presented line of opening.

Provided for encasement within cover 1 is a mattress body, which in the present instance comprises a customary inner sring, designated 9, comprising upper and lower rigid rectangular frames 10, 11, as of suitable rod stock; there being a plurality of the usual cross members 12, 12′, respectively, extending therebetween to which latter are suitably fixed spring coils 13. Secured also to lower frame 11 are studs 14, as of wood, for supporting corner blocks 15 which tend to maintain upper and lower frames 10, 11 in spaced relationship. Said frames 10, 11 may also be provided coveringly with the customary pads 16, as of felt or comparable materials. It is recognized that inner springs do not normally embody studs and corner blocks but the foregoing merely presents a composite structure for purposes of description.

Figure 3:
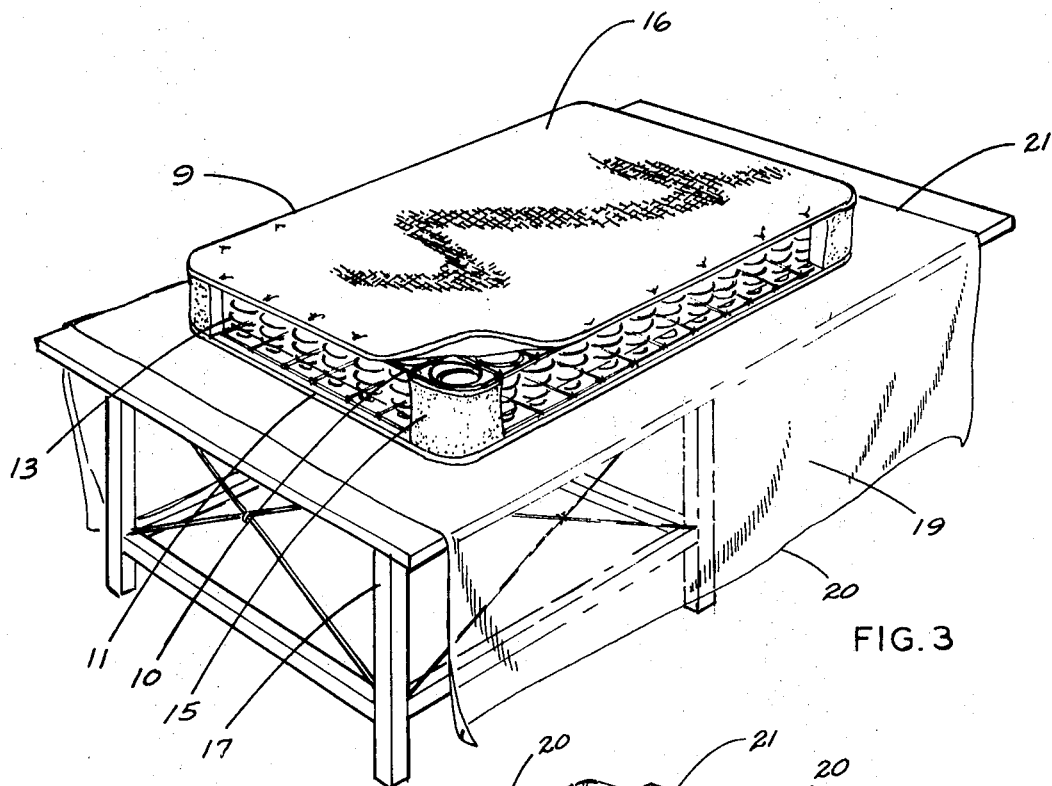
FIG. 3 is a perspective view illustrating the initial step in performing the method of the present invention for covering a coil spring unit.
Figure 4:
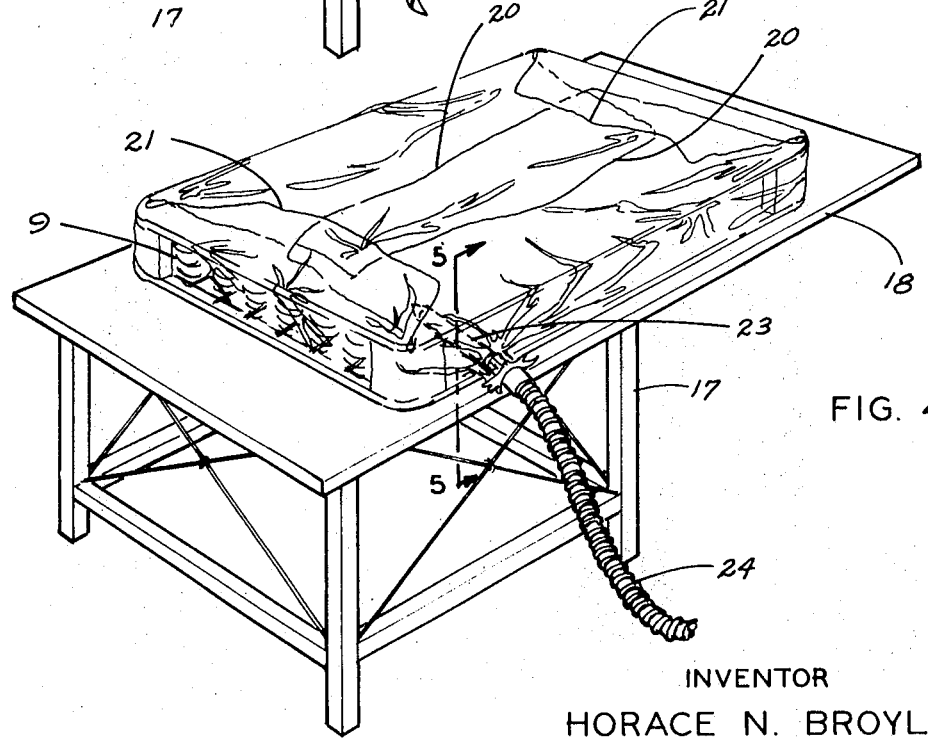
FIG. 4 is a perspective view of the coil spring unit illustrated in FIG. 3, being encased for air evacuation.
Figure 5:
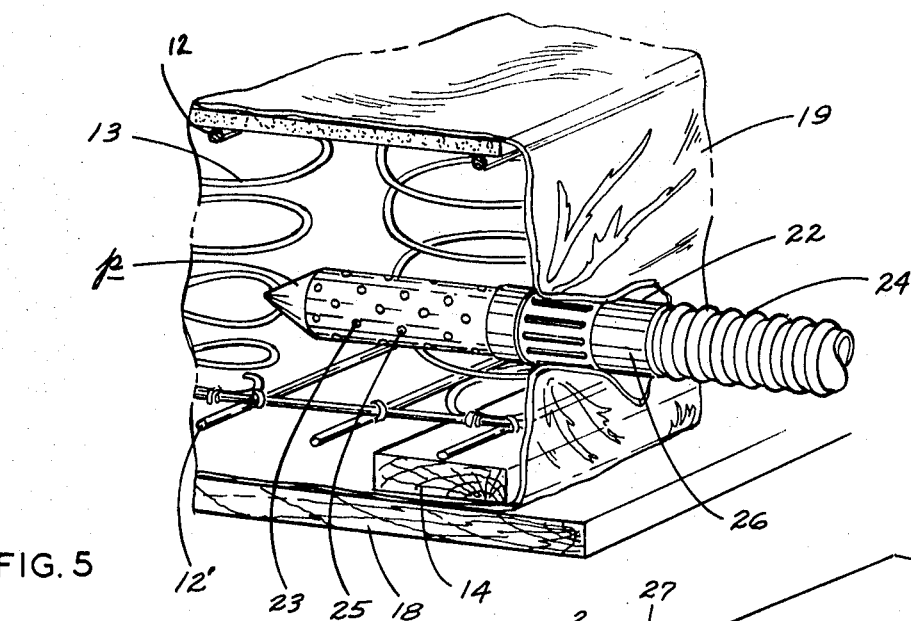
FIG. 5 is a fragmentary vertical transverse sectional view taken on the line 5—5 of FIG. 4.
Figure 7:
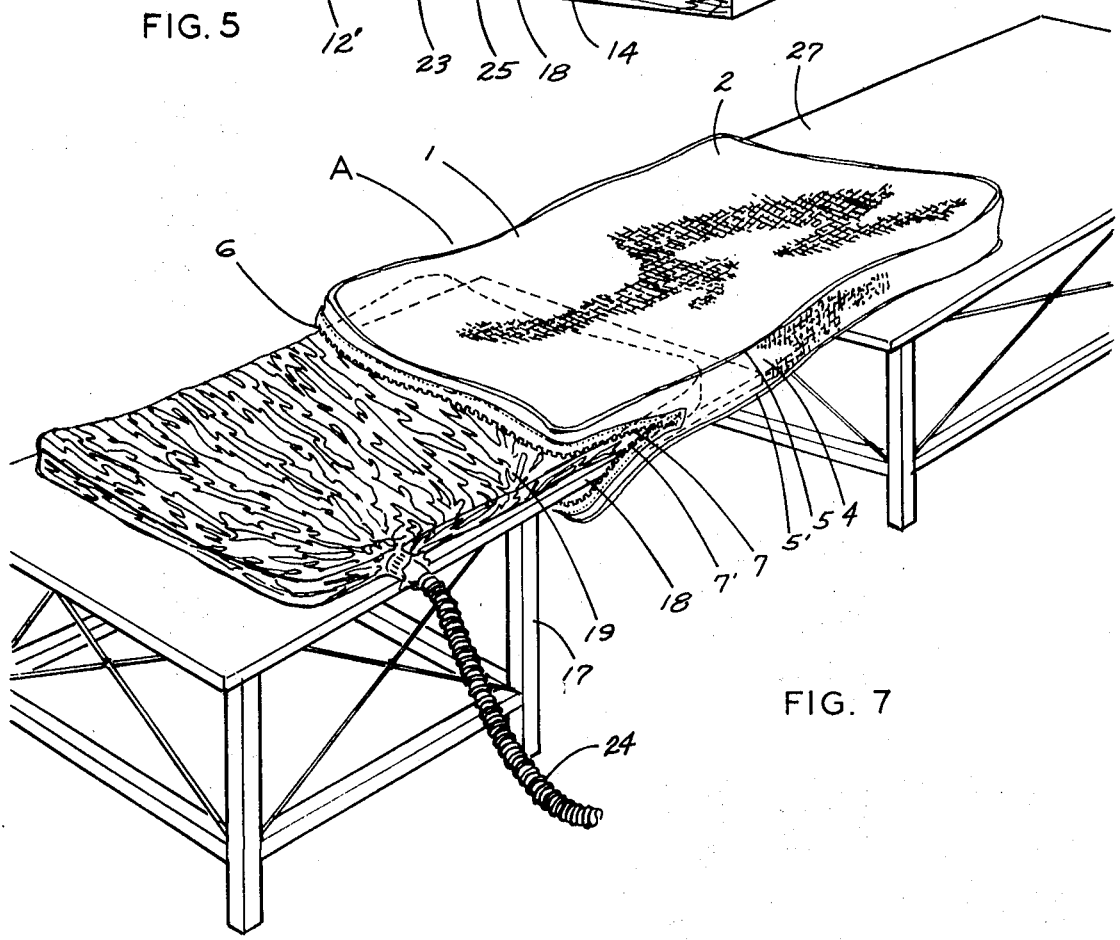
FIG. 7 is a perspective view illustrating the step of inserting the evacuated coil spring unit within the mattress cover.
Figure 8:
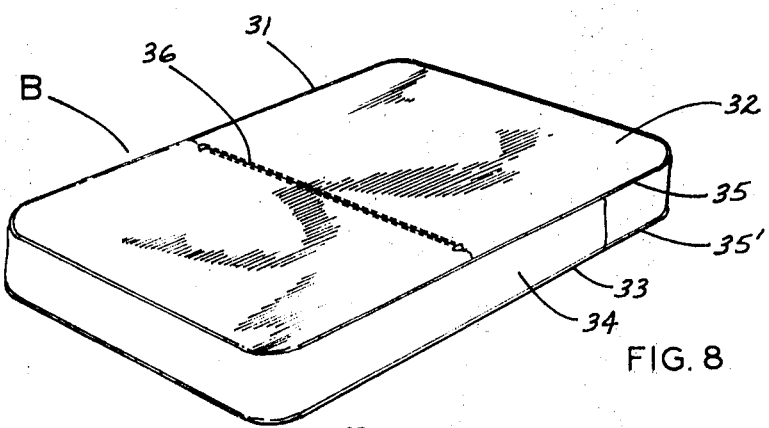
FIG. 8 is a perspective view of another form of mattress produced pursuant to the persent invention.

For the purpose of installing inner spring 9 within cover 1, there is provided a table or like support member 17 having an extension 18 of cantilever character for purposes presently appearing. Disposed over the top of table 17 is a sheet 19 of plastic, such as polyethylene, which is thin and flexible to conform to any selected shape; said sheet being non-porous so as to be impervious to gas. Sheet 19 may preferably be of rectangular form having opposed side edges 20 and end edges 21; and being of an area sufficient for full envelopment of inner spring 9, which latter, as shown in FIG. 3, is placed upon the table supporting portion of said sheet 19. The side and end portions of said sheet 19 are then drawn upwardly and overlappingly upon the upper surface of inner spring 9 for full casing thereof (see FIG. 4). Sheet 19 may be provided with an opening, as at 22 (see FIG. 5), which would be located for disposition on one side of said inner spring 9 proximate one end thereof. Said opening 22 may be preformed or provided by puncturing in a manner shortly to be described; or simply the result of appropriate gathering of sheet 19. Presented for extension through opening 22 is a vacuum head 23 connected by a flexible conduit or hose 24 to a vacuum source, as a conventional vacuum machine (not shown). Said vacuum head 23 is of tubular form with its free end being provided with a preferably pointed end wall, as at $p$, which serves as a punch for facilitating forming opening 22 if the same has not been preformed. Throughout its length head 23 is provided with circumferentially presented, staggered perforations 25. Between head 23 and conduit 24 is a handle-forming sleeve 26 which permits facility in handling said vacuum head 23.

Figure 6:
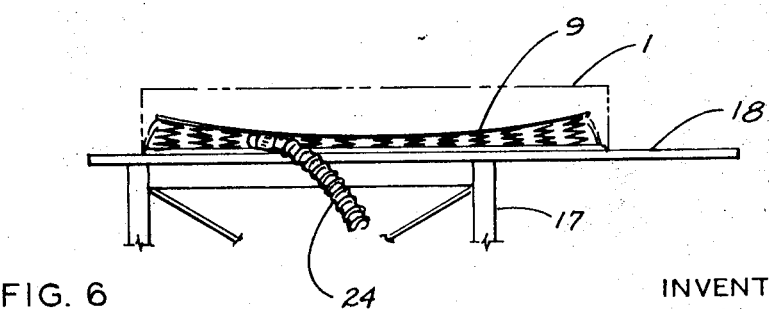
FIG. 6 is a side view illustrating the coil spring unit in full lines subsequent to air evacuation with its initial volume being indciated in phantom lines.

The portions of sheet 19 about said opening 22 are drawn about handle 26 so as to limit any air flow therethrough. With vacuum head 23 so positioned, the vacuum machine is operated to develop a suction so as to effect air evacuation of the now sheet-enclosed inner spring. Such action will bring about a volumetric reduction of inner spring 9 wherein upper frame 10 will be drawn downwardly toward lower frame 11 as the external pressure will be relatively sufficient to overcome the resistance of coil springs 13. It has been found in actual practice that inner springs and box springs can be reduced in volume within a range of 30 to 40 percent of their original volume, as indicated in FIG. 6. It is to be observed that with springs of such type there is no reduction in the length or width, but merely in the height.

With said inner spring 9 so compressed, and while still enveloped within film 19, the end portion thereof remote from that engaged to vacuum head 23 is addressed to the line of opening 6 of cover 1 (see FIG. 7) for movement therethrough into the interior of said cover 1. Handle 26 serves as a convenient grip for assisting in manipulation of reduced inner spring 9 and since cover 1 provides an accepting volume substantially greater than the now compressed inner spring 9, the movement of the latter into cover 1 is easily achieved; all the heretofore limiting tolerances being avoided, as well as resort to a filling machine. Furthermore, sheet 19 with its relatively slick surface substantially eliminates friction so that no untoward inhibition is developed by the fabric of cover 1 during the cover-receiving operation. With inner spring 9 fully within cover 1, handle 26 will substantially abut against the adjacent extremity of the slide fastener so that slide 8 may be moved along the opposite side, thence along the intervening end portion, and then along the remaining side portion until it substantially has reached handle 26. More than the major portion of the cover closing operation has been effected, while inner spring 9 has been under subjection to the vacuum. At this point vacuum head 23 is withdrawn and slide 8 moved to fully closed position. Such interval is relatively brief so that very little change could have occurred in inner spring 9 by reason of withdrawal of the vacuum. Since cover 1 is provided with the customary breathing opening, air, under the external pressure, will flow into cover 1 and thence through opening 22 so as to gradually cause inner spring 9 to be returned to normal condition wherein it fills cover 1. By reason of the compression of inner spring 9, it is apparent that the operator is given ready control for tailoring of the mattress to effect desired relative positioning of cover 1. Furthermore, by this unique operation, the problems of closing a mattress after receiving the mattress body are avoided.

From the foregoing it is thus apparent that the heretofore necessary and expensive filling box, tape edge machine, and press are eliminated from mattress and box spring production so that very little is required in the way of equipment and, manifestly, the method of the present invention can be easily practiced by relatively unskilled personnel.

Referring now to FIGS. 8–12, inclusive, there is disclosed the use of the present invention with a mattress having a body of unitary, molded character, such as are incorporated in what are more commonly known as crib mattresses. Exemplary of such mattresses is indicated at B in FIG. 8 which incorporates a cover or tick 31 comprising top and bottom rectangular panels 32, 33, a side panel or border 34 with tapes 35 decoratively masking the lines of stitching between said panels. Provided in top panel 32 is a line of opening 36 which extends substantially across the transverse center line thereof and with its ends terminating spacedly from the adjacent side margins. Received within said cover 31 is a mattress core constituted of a block 37 of resilient cellular cushion material, such as, foam rubber, polyurethane foam, vinyl chloride polymer foam, etc., and being dimensioned for snug reception within said cover 31.

Figure 11:
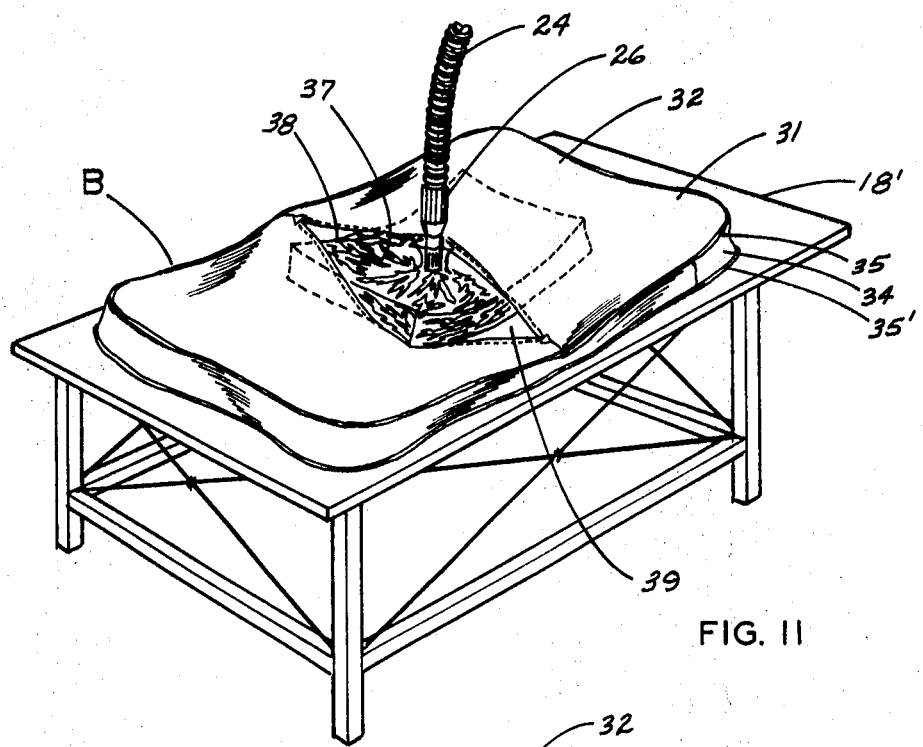
FIG. 11 is a perspective view illustrating the insertion of the evacuated block of FIG. 10 within a mattress cover.
Figure 12:
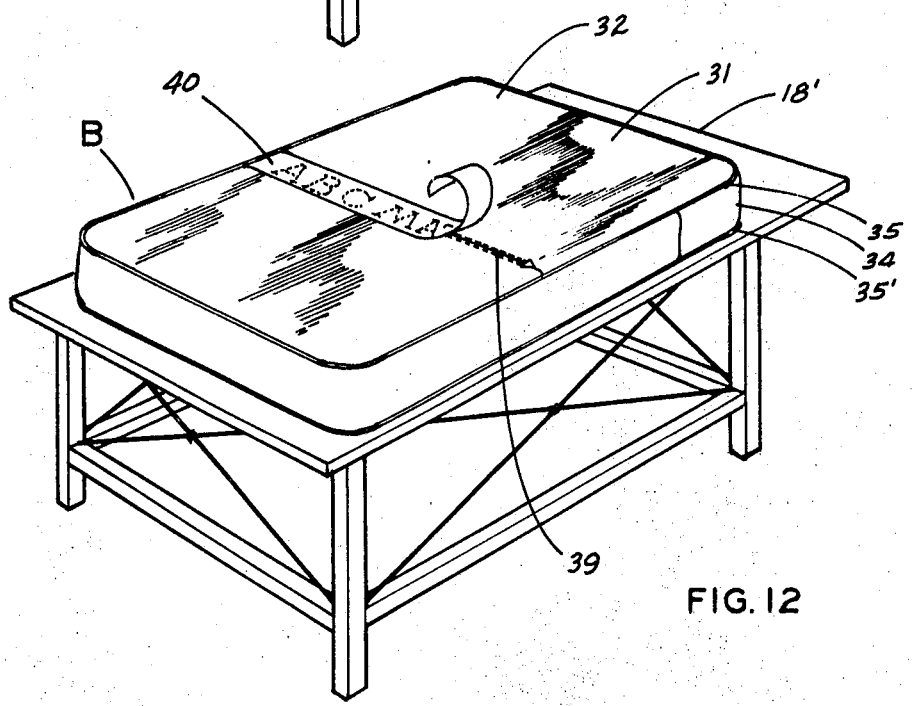
FIG. 12 is a perspective view illustrating the closure of the mattress subsequent to the step illustrated in FIG. 11.

In production, a plastic sheet 38, which is in all respects structurally and functionally similar to plastic sheet 19 hereinabove described, is draped upon a table or other support 18' and block 37 is disposed thereon. Sheet 38 is then pulled upwardly and about block 37 for enshrouding the latter. However, the vacuum head is presented through said sheet 38 in its central upper portion as may best be seen in FIG. 9 so that the same is substantially axially perpendicular to the upper surface of said block 37. Thereupon, the vacuum is applied and air is evacuated from block 37 causing same to be volumetrically reduced with a shortening through each of its dimensions, as length, width, and height, as contradistinguished from box spring 9, which, by reason of the rigidity of frames 10, 11 is reduced only through its height. Said block 37 is compressed thereby into a volume which approximates 30 percent of its normal volume (FIG. 10) and such relatively small mattress body may be easily manipulated by appropriate operation of handle 26 so as to move the said body about for inserting same through opening 36 in cover 31, as shown in FIG. 11. With block 37 in cover 31, vacuum head 23 will be substantially at the midpoint of the upper face of the latter so that closure of linear opening 36 may be commenced, as by a suitable tape 40, until the vacuum head 23 is reached. Thereupon, the latter is removed and the now initiated closing operation continued more rapidly so that full closure is effected prior to return of block 37 to full volume by reason of air flowing through the "breathers" in mattress cover 31 and the opening from which vacuum head 23 was withdrawn. In this instance, as well, plastic casing 38 serves to reduce friction and thereby allow ease of positionment of block 37 within cover 31 to provide excellent tailoring.

It is to be especially noted that as fully expanded, block 37 will cause no untoward pressure against the centrally located line of opening 36 so that the latter may be securely closed by tape 40, which, if desired, may bear appropriate indicia for advertising or trademark purposes.

The foregoing demonstrates that the present invention is equally useful with all types of mattress bodies.

Figure 13:
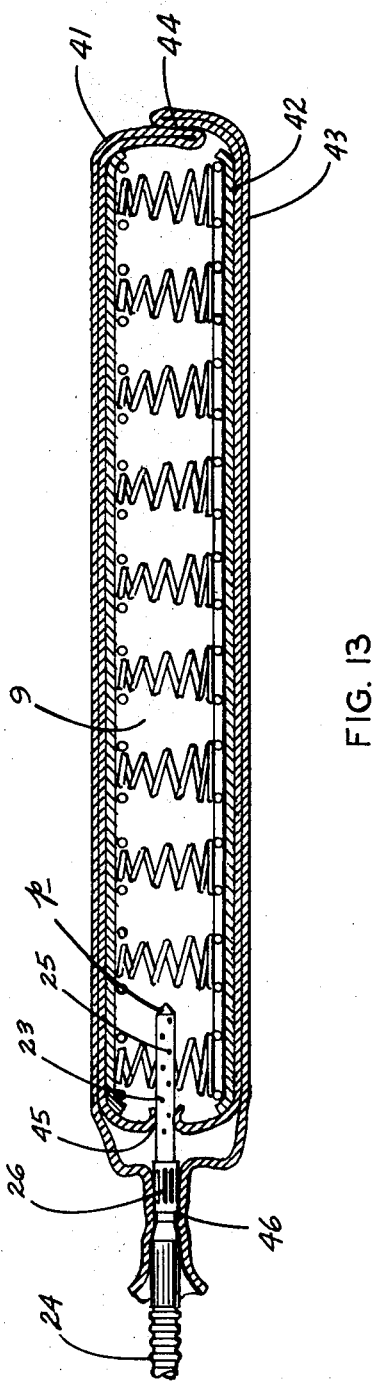
FIG. 13 is a vertical, longitudinal, sectional view through a box spring encased within sheeting preparatory to air evacuation but illustrating another arrangement of the sheeting to allow for removal.
Figure 14:
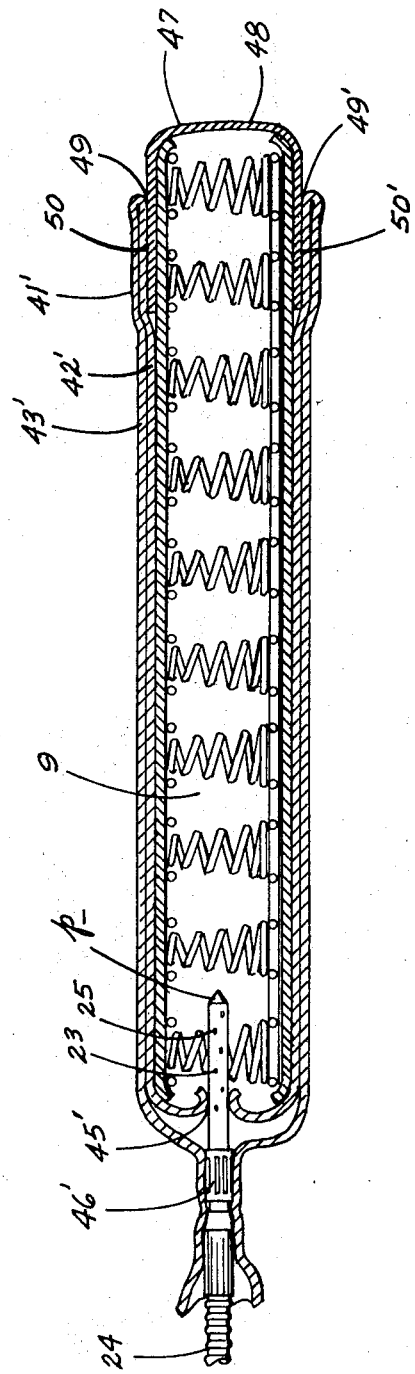
FIG. 14 is a longitudinal sectional view through a box spring preparatory to air evacuation but illustrating another form of encasing means adapted for withdrawal.

In the examples hereinabove described, the mattresses A and B contain the mattress body enclosed within the respective sheet 19 and 38. However, it has been found that in certain instances it may be desirable to effect removal of the sheeting prior to closure of the cover. Referring now to FIGS. 13 and 14, arrangements of such sheets are shown which will permit withdrawal of the same.

Figure 9:
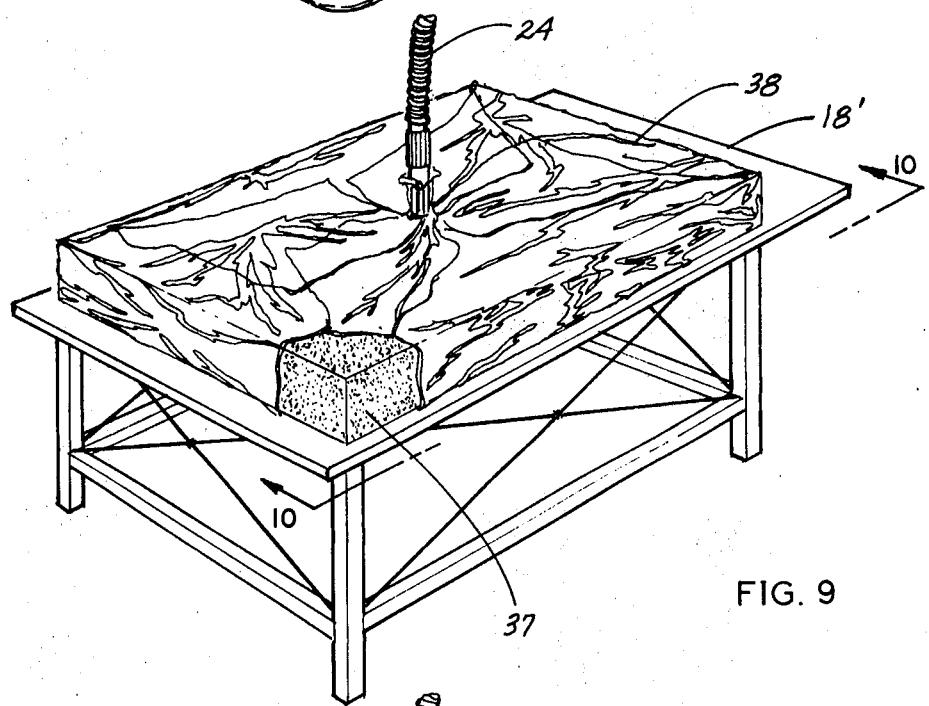
FIG. 9 is a perspective view of a resilient block for body support purposes encased within the sheeting preparatory to air evacuation.
Figure 10:
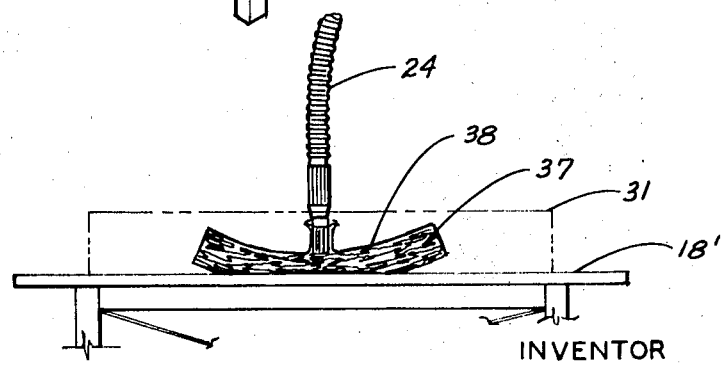
FIG. 10 is a side view illustrating the resilient block subsequent to air evacuation with the evacuated block being shown in full lines and the initial dimensions being indicated in phantom lines.

Turning to FIGS. 14, 9 indicates an inner or box spring, while 41 designates a sheet of plastic material in all respects similar to sheet 19 above described. However, said sheet 41 is doubled upon itself so as to form inner and outer piles 42, 43, respectively. The doubled ends of said sheet 41 are adapted to overlap, as at 44, on the side of coil spring unit 9 opposite that receiving vacuum head 23; said latter extending through an opening 45 in inner ply 42 and with the adjacent portions of outer ply 43 being suitably gathered about handle 26, as at 46. It will thus be seen that after the evacuated coil spring unit 9 has been received within its cover and the closing operation commenced, plastic sheet 41 may be pulled outwardly by gripping the sheet covered handle 26 so that if head 23 is pulled away, so will sheeting 41 be simultaneously withdrawn. It is, of course, apparent that during the application of the vacuum, the overlapping ends of sheet 41, at 44, serve to form a snug seal.

Referring now to FIG. 14, 47 indicates a short bag or boot having an end portion 48 and side portions 49, 49' for disposition against the upper and lower portions of coil spring unit 9. 41' indicates a sheet which in all respects is similar to sheet 41 hereinabove described and being doubled over to provide inner and outer plies 42', 43', respectively. However, in the present instance, the doubled ends of said sheet 41', as at 50, 50', partially overlap the proximate side portions 49, 49', respectively, of bag 47 and terminates spacedly from end portion 48. The vacuum head 23 similarly projects through an opening 45' in inner ply 42' and with its handle having gathered about it, as at 46', portions of outer ply 43'. Thus, upon withdrawal of vacuum head 25 sheet 41' may be contemporaneously removed. It is recognized, however, that bag 47 will remain within the finished mattress.

Having described my invention, what I claim and desire to obtain by Letters Patent is:

1. A method for covering a resilient body support member comprising providing a cover having a pair of spaced-apart panels and an intervening side border being dimensioned for snuggly accepting said body support member when the latter is in normal condition, providing a line of opening within said cover for receiving said body support member, providing a flexible sheet of substantially gas impervious, flexible, shape-conforming material, enveloping said body support member by said sheet by wrapping said sheet about said member with the edge portions of said sheet being free, providing a vacuum to said body support member within said sheet, evacuating air from said body support member for reducing the same volumetrically while causing said sheet to be drawn tightly thereabout, inserting the volumetrically reduced sheet enclosed body support member through said line of opening for reception within said cover, withdrawing said vacuum from said body support member for allowing the latter to return to said normal condition, and closing said line of opening.

2. A method for covering a resilient body support member as defined in claim 1 and further characterized by said body support member being of coil spring character.

3. A method for covering a resilient body support member as defined in claim 1 and further characterized by said resilient body support member being a block of cellular preformed material.

4. A method for covering a resilient body support member as defined in claim 3 and further characterized by the cover line of opening being provided transversely within the panel of the upper portion of said cover, said vacuum being applied to the upper central portion of said block for facilitating movement of the same when volumetrically reduced through said line of opening.

5. A method for covering a resilient body support member as defined in claim 4 and further characterized by commencing closing of said line of opening before the vacuum has been withdrawn and completing said closing after withdrawal of the vacuum whereby the closing operation is completed before the block has been restored to normal condition.

6. A method for covering a resilient body support member as defined in claim 5 and further characterized by providing a tape and closing said line of opening by said tape.

7. A method for covering a resilient body support member as defined in claim 1 and further characterized by maintaining said vacuum upon said body support member as the same is received within the cover, commencing closing of said line of opening while said vacuum is maintained, withdrawing said vacuum, and then completing closing of said line of opening whereby said body support member will return to its normal volume subsequent to the closure of said line of opening.

8. A method for covering a resilient body support member as defined in claim 1 and further characterized by providing a support table having an extension of the cantilever type; placing said flexible sheet on said support table; spacing said body support member on said support table overlyingly of said flexible sheet; providing said vacuum to said body support member within said sheet adjacent the extension remote end of said support table; inserting the vacuum remote portion of said volumetrically reduced body support member and said support table extension into said line of opening of said cover; sliding said volumetrically reduced body support member over said support table extension through said line of opening for reception within said cover; removing said cover together with said volumetrically reduced body support member for said support table extension before withdrawing said vacuum from said body support member.

9. A method for covering a resilient body support member comprising providing a cover dimensioned for accepting said body support member when the latter is in normal condition and having a line of opening formed therein, providing a flexible sheet of substantially gas impervious, flexible, shape-conforming material, providing a bag member for disposition upon one edge portion of said support member, folding said sheet material upon itself to provide inner and outer plies, presenting said sheet about said body support member for cooperating with said bag to envelop said body support member, portions of said sheet overlapping said bag, providing a vacuum head attached to a vacuum source, extending said vacuum head through the inner ply of said sheet opposite said bag for extension into said body support member, gathering the adjacent portions of the outer ply about the vacuum connection, operating said vacuum head to evacuate air from said body support member for reducing the same volumetrically, inserting the volumetrically reduced body support member through said line of opening for reception within said cover while said vacuum is applied, then simultaneously withdrawing said vacuum and said sheet by removal of said vacuum head for allowing the body support member to return to normal condition, and then closing said line of opening.

10. A method for covering a resilient body support member comprising: providing a cover dimensioned for accepting said body support member when the latter is in normal condition and having a line of opening formed therein; providing a flexible sheet of substantially gas impervious, flexible, shape-conforming material; folding said sheet upon itself for forming folded end portions; enveloping said body support member by said sheet with the folded end portions overlapping to provide a seal; providing a vacuum to said body support member within said sheet with the opposed margins of said sheet having contiguous portions with said vacuum; evacuating air from said body support member by said vacuum for reducing same volumetrically and causing said sheet to be drawn tightly thereabout; then inserting the volumetrically reduced body support member through said line of opening for reception within said cover; withdrawing said vacuum and said sheet contemporaneously from said body support member for allowing the later to be returned in normal condition; and closing said line of opening.

References Cited

UNITED STATES PATENTS

| | | | |
|---|---|---|---|
| 489,540 | 1/1893 | Moore | 53—255 |
| 2,764,859 | 10/1956 | Hanselmann | 29—91.1 UX |
| 3,238,599 | 3/1966 | Bauman | 53—22 (B) X |
| 3,458,966 | 8/1969 | Dunbar et al. | 53—22 (B) X |
| 3,521,424 | 7/1970 | Wirfel | 53—22 (B) X |

FOREIGN PATENTS

| | | | |
|---|---|---|---|
| 1,064,422 | 4/1967 | Great Britain | 53—22 (B) |

FRANK T. YOST, Primary Examiner

U.S. Cl. X.R.

29—91.5; 53—22 B

PO-1050
(5/69)

UNITED STATES PATENT OFFICE
CERTIFICATE OF CORRECTION

Patent No. 3,611,524                    Dated October 12, 1971

Inventor(s) Horace N. Broyles

It is certified that error appears in the above-identified patent and that said Letters Patent are hereby corrected as shown below:

In the Claims:

Claim 8, Column 6, line 74, "spacing" should be ---placing---; same claim, Column 7, "for" should be ---from---.

Signed and sealed this 14th day of March 1972.

(SEAL)
Attest:

EDWARD M. FLETCHER, JR.                ROBERT GOTTSCHALK
Attesting Officer                       Commissioner of Patents